(12) United States Patent
Badami

(10) Patent No.: US 7,504,809 B2
(45) Date of Patent: Mar. 17, 2009

(54) POWER SUPPLY AND A DEVICE FOR PROVIDING A CONTROL VOLTAGE THAT IS SUBSTANTIALLY EQUIVALENT TO A REFERENCE VOLTAGE USED BY THE POWER SUPPLY

(75) Inventor: Kais Kaizar Badami, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 302 days.

(21) Appl. No.: 11/138,948

(22) Filed: May 26, 2005

(65) Prior Publication Data

US 2006/0267564 A1    Nov. 30, 2006

(51) Int. Cl.
*G05F 1/613* (2006.01)
*G05F 3/00* (2006.01)
*G05F 1/00* (2006.01)

(52) U.S. Cl. .................. 323/281; 323/274; 323/280; 323/284; 323/285; 323/223; 323/228

(58) Field of Classification Search ............... 323/274, 323/280, 281, 284, 285, 223, 228
See application file for complete search history.

(56) References Cited

OTHER PUBLICATIONS

Dongyan Zhou, Design Note 295, 2002, Linear Technology, pp. 1-2.*
Linear Technology, Datasheets for LTC1773, 2000, Linear Technology, pp. 1-20.*
TI/Burr-Brown, Datasheets for INA132, Burr-Brown, 1996, pp. 1-9.*
Maxim Integrated Products, Application Note 1045, Apr. 11, 2002, p. 1-2.*
Maxim Integrated Products, Datasheet for MAX1953, Apr. 2002, Rev. 0, p. 1-22.*

* cited by examiner

*Primary Examiner*—Akm E Ullah
*Assistant Examiner*—Jue Zhang

(57) ABSTRACT

In an embodiment of the present invention there is provided a device for providing a control voltage that is substantially equivalent to a reference voltage used by a power supply. The device includes a first electronic circuit that is arranged to be connected to a ground via a resistor and to produce a supplementary voltage that is dependant on a resistance of the resistor. The device also includes a second electronic circuit that is arranged to present a resistance to a current in order to provide the control voltage and to receive an output voltage of the power supply and the supplementary voltage to effect the current.

17 Claims, 3 Drawing Sheets

| V out (volt) | R_adj (ohm) |
|---|---|
| 0.9 | 6810 |
| 1.0 | 3160 |
| 1.1 | 1820 |
| 1.2 | 1180 |
| 1.3 | 806 |
| 1.4 | 536 |
| 1.5 | 348 |
| 1.6 | 210 |
| 1.7 | 97.6 |
| 1.8 | 0 |

POWER SUPPLY AND A DEVICE FOR PROVIDING A CONTROL VOLTAGE THAT IS SUBSTANTIALLY EQUIVALENT TO A REFERENCE VOLTAGE USED BY THE POWER SUPPLY

FIELD OF THE INVENTION

The present invention relates generally to the field of adjustable power supplies and has particular—but by no means exclusive—application to an adaptable power supply specified in an X2 multi-source agreement.

BACKGROUND OF THE INVENTION

Adjustable power supplies (which are sometimes referred to as adaptable power supplies) are arranged to allow their output voltage to be varied so that it can be set at a required potential. There are several different techniques that can be employed to allow the output voltage to be varied. One of these techniques essentially involves obtaining a portion of the output voltage via a voltage divider network, and providing the portion of the output voltage to an electronic control circuit that is arranged to alter (if necessary) the output voltage such that the portion of the output voltage is substantially equivalent to a fixed internal reference voltage of the power supply. Thus, by changing a resistance of a particular 'control' resistor in the voltage divider network it is possible to vary the output voltage of the power supply. Changing the resistance of the control resistor will bring about a change in the potential of the portion of the output voltage, which in turn causes the power supply to alter its output voltage such that the portion of the output voltage is substantially equivalent to the internal reference voltage.

An example of where the above technique is used is in the X2 multi-source agreement. The X2 agreement defines a fiber-optical module that conforms to the 10 Gigabit Ethernet standard as specified in IEEE 802.3ae and which is to interface to an external adaptable power supply. The X2 agreement defines several discrete resistance values for the control resistor (in the aforementioned voltage divider network) and the associated output voltage that the adaptable power supply should produce for each of the discrete resistance values. The fiber-optical module is basically arranged to set the resistance of the control resistor to the discrete resistance values so as to set the output voltage of the adaptable power supply as required.

The developers of the X2 agreement selected the discrete resistance values for the control resistor based on the assumption that the adaptable power supply has an internal reference voltage of 0.8 volts. As such the discrete resistance values are such that there will be 0.8 volts across the control resistor (that is, the portion of the output voltage) for the associated output voltage of the adaptable power supply.

An undesirable consequence of having selected the discrete resistance values based on the assumption that adaptable power supplies use a 0.8 volt internal reference is that it restricts designers of adaptable power supplies to using only DC-DC converters that have a 0.8 volt reference, even though DC-DC converters are available in a range of reference voltages (which is typically 0.5 volts to 1.5 volts). Whilst designers can readily design adaptable power supplies using DC-DC converters that use a voltage reference other than 0.8 volts, such adaptable power supplies would not accord with the X2 multi-source agreement because the discrete resistance values of the control resistor would not result in the adaptable power supply producing the associated output voltage. For instance, instead of producing an output voltage of 1 volt for a control resistor of 3160 ohms (as specified in the X2 agreement) the adaptable power supply could output, for example, 1.6 volts.

Being restricted to using only DC-DC converters that use a 0.8 volt reference means that designers are not able to benefit from the various technical and economic benefits that could stem from being able to use DC-DC converters over a range of reference voltages.

SUMMARY OF THE INVENTION

In an embodiment of the present invention there is provided a device for providing a control voltage that is substantially equivalent to a reference voltage used by a power supply. The device includes a first electronic circuit that is arranged to be connected to a ground via a resistor and to produce a supplementary voltage that is dependant on a resistance of the resistor. The device also includes a second electronic circuit that is arranged to present a resistance to a current in order to provide the control voltage and to receive an output voltage of the power supply and the supplementary voltage to effect the current.

The present invention will be more fully understood from the following description of specific embodiments. The description is provided with reference to the accompanying drawings.

BRIEF DESCRIPTION OF THE DRAWINGS

FIG. 1b illustrates the flow of currents in the device of FIG. 1a; and

FIG. 2 illustrates an adaptable power supply that includes the device shown in FIG. 1a.

DETAILED DESCRIPTION

The X2 multi-source agreement defines a fiber-optical module that accords with the IEEE 802.3ae 10 Gigabit Ethernet standard. Details of the X2 multi-source agreement can be found at www.x2msa.org. The fiber-optical module defined in the X2 agreement includes an adaptable (adjustable) power supply capable of allowing its output voltage to be varied between 0.9 volts and 1.8 volts in 0.1 volt increments. Furthermore, the fiber-optical module of the X2 agreement is arranged to vary the output voltage of the adaptable power supply by changing the resistance of an internal control resistor, which is to be coupled to ground. The internal control resistor is also arranged to form part of a voltage divider network, which is electrical coupled to the output voltage of the adaptable power supply.

The X2 agreement defines ten discrete resistance values for the internal control resistor and the output voltage the adaptable power supply should produce for each of the ten discrete resistance values. The discrete resistance values range from 0 ohms to 6810 ohms. If, for example, the fiber-optical module requires the adaptable power supply to provide an output voltage of 1.4 volts the fiber-optical module can set the resistance of the internal control resistor to 536 ohms.

As noted previously, one of the shortcomings of the X2 multi-source agreement is that designers of adaptable power supplies for the X2 agreement are restricted to using DC-DC converters that use an internal reference voltage of 0.8 volts. This shortcoming is essentially due to the fact that the discrete resistance values of the internal control resistor have been calculated assuming the reference voltage is 0.8 volts. As persons skilled in the art will readily appreciate the reason the designers of the X2 agreement assumed the adaptable power supply would use a 0.8 volt reference was to make the task of calculating the ten discrete resistance values relatively straight forward.

Figure 1A:
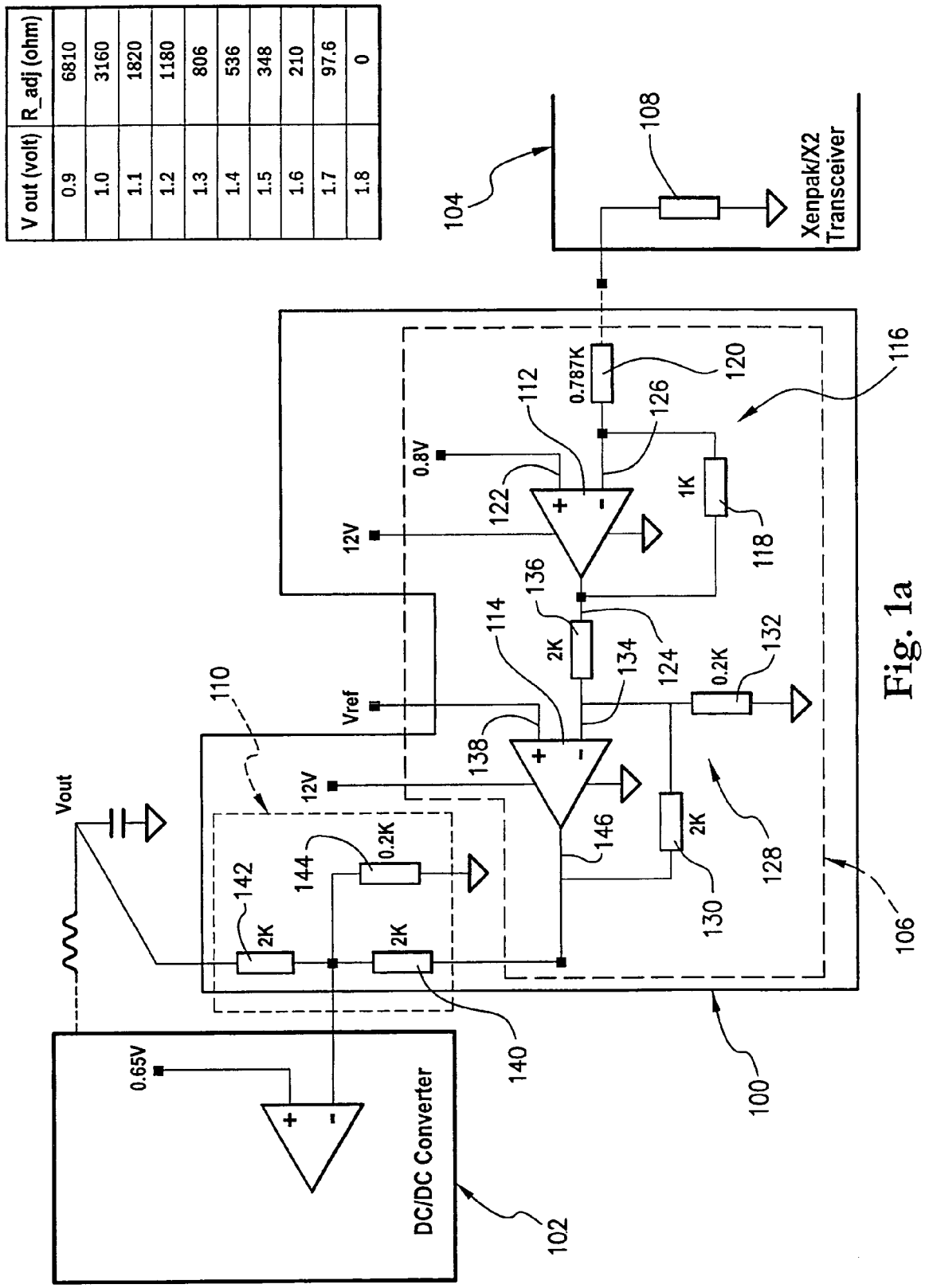
FIG. 1a is a schematic diagram of a device according to an embodiment of the present invention.

The device 100 shown in FIG. 1a enables designers to avoid the aforementioned problem associated with using DC-DC converters that do not use a 0.8 volt reference voltage. The device 100 essentially dispenses with the passive voltage divider network that has previously been used in the X2 agreement and replaces it with the device 100, which can be considered an active electronic circuit. The device 100 is essentially designed to be electrically coupled to the adaptable power supply 102 and the fiber-optical module 104. The device 100 basically provides a control voltage (which may also be referred to as a feedback voltage) that is substantially equivalent to the reference voltage used by the DC-DC converter used in the adaptable power supply 102.

The device 100 includes two electronic circuits. A first circuit 106 is arranged to be connected to ground via the internal control resistor 108 of the fiber-optical module 104 and to produce a supplementary voltage that is dependant on the resistance of the internal control resistor 108. A second circuit 110 is essentially arranged to present a resistance to a current flowing therein in order to provide the control voltage. In order to establish the current the second circuit 110 is arranged to receive the output voltage of the adaptable power supply 102 and the supplementary voltage produced by the first 106 circuit.

The first circuit 106 includes two differential amplifier circuits 112 and 114, which in the present embodiment are in the form of general purpose integrated (circuit) operational amplifiers such as, for example, the LM1458 from National Semiconductor. Persons skilled in the art will readily appreciate that different forms of the differential amplifier circuits 112 and 114 can be used in alternative embodiments of the device 100. For instance, instead of using integrated operational amplifiers the differential amplifier circuits 112 and 114 could be made up of discrete components.

The first differential amplifier circuit 112 is arranged to produce an intermediate voltage that is substantially equivalent to a required output voltage of the adaptable power supply 102, which is effectively one of the voltages specified in the table contained in FIG. 1a. The second differential amplifier circuit 114 is arranged to receive the intermediate voltage from the first differential amplifier 112 in order to produce the supplementary voltage, which is received by the second circuit 110.

The first circuit 106 also includes a feedback network 116 that is arranged to provide negative feedback to the first differential amplifier circuit 112. The feedback network 116 includes three resistors 118, 120 and 108. A first of the resistors 118 in the feedback network 116 has a resistance of 1000 ohms, while a second of the resistors 120 in the feedback network 116 has a resistance of 787 ohms. The third resistor 108 in the feedback network 116 is the internal control resistor 108 of the fiber-optical module 108. The non-inverting input 122 of the first differential amplifier 112 is held at a 0.8 volt potential when the device 100 is 'powered-up'. The feedback network 116 is coupled to the output 124 and the inverting input 126 of the first differential amplifier circuit 112 and basically sets the gain of the first differential amplifier 112 such that the intermediate voltage provided by the first differential amplifier 112 has a potential that is substantially equivalent to a required output voltage of the adaptable power supply 102 when the device 100 is powered-up.

The first circuit 106 includes another feedback network 128 that is arranged to provide the second differential amplifier circuit 114 with negative feedback. The feedback network 128 of the second differential amplifier 114 includes a first resistor 130 that has a resistance of 2000 ohms and a second resistor 132 that has a resistance of 200 ohms. The inverting input 134 of the second differential amplifier circuit 114 is coupled to the output 124 of the first differential amplifier 112. This enables the intermediate voltage to be supplied to the inverting input 134 of the second differential amplifier 114. The inverting input 134 of the second differential amplifier 114 is coupled to the output 124 of the first differential amplifier 112 via a resistor 136, which has a resistance of 2000 ohms. The non-inverting input 138 of the second differential amplifier circuit 114 is held at a voltage that is substantially equivalent to the internal reference voltage of the DC-DC converter of the adaptable power supply 102. The first resistor 130 and the second resistor 132 of the feedback network 128 essentially cause the inverting input 134 of the second differential amplifier circuit 114 to be held at the same potential as the non-inverting input 138.

As described previously, the device 100 includes a second electronic circuit 110 that is essentially arranged to present a resistance to a current flowing therein in order to provide the control voltage. More specifically, the second electronic circuit 110 includes three resistors 140, 142 and 144. A first resistor 140 is electrically coupled to the output 146 of the second differential amplifier 114 so as to receive the supplementary voltage. A second resistor 142 is arranged to be electrically coupled to the output voltage supply rail of the adaptable power supply 102 so as to receive the output voltage of the adaptable power supply 102. A third resistor 144 is coupled to the first and second resistors 140 and 142 and is also coupled to ground. The three resistors 140, 142 and 144 in the second electronic circuit 110 have the respective resistances of 2000 ohms, 2000 ohms and 200 ohms.

Because the DC-DC converter in the adaptable power supply 102 will force the negative terminal of its internal operational amplifier to a potential that is substantially equivalent to the potential of its non-inverting input the voltages across the first resistor 140 of the second electronic circuit 110 and the first resistor 130 in the feedback network 128 of the second differential amplifier 114 will be substantially equivalent. It therefore follows that since the resistors 140 and 130 have equivalent resistances the currents through them will be equivalent. A fixed portion of this current is sunk to ground via the resistors 132 and 144, which also have equivalent resistors. Hence the current through resistors 140 and 130 will be equivalent and the current through resistors 144 and 132 will also be equivalent.

It will be readily appreciated by persons skilled in the art that in accordance with Kirchoffs current law the current through resistors 142 and 136 will be equivalent. Because resistors 136 and 142 have equivalent resistances, the voltage across resistor 136 will be equivalent to the voltage across resistor 142. Furthermore, it is noted that the voltage across resistor 136 is equivalent to the voltage at the output 124 of the first differential amplifier 114 minus the internal reference voltage of the adaptable power supply 102, and that the voltage across resistor 142 is equivalent to the output voltage of the adaptable power supply 102 minus the internal reference voltage of the adaptable power supply 102. Consequently, the voltage at the output 124 of the first differential amplifier circuit 112 is equivalent to the voltage at the output of the adaptable power supply 102.

Thus, by coupling an output voltage adjustment terminal (or feedback terminal) of the adaptable power supply 102

Figure 1B:
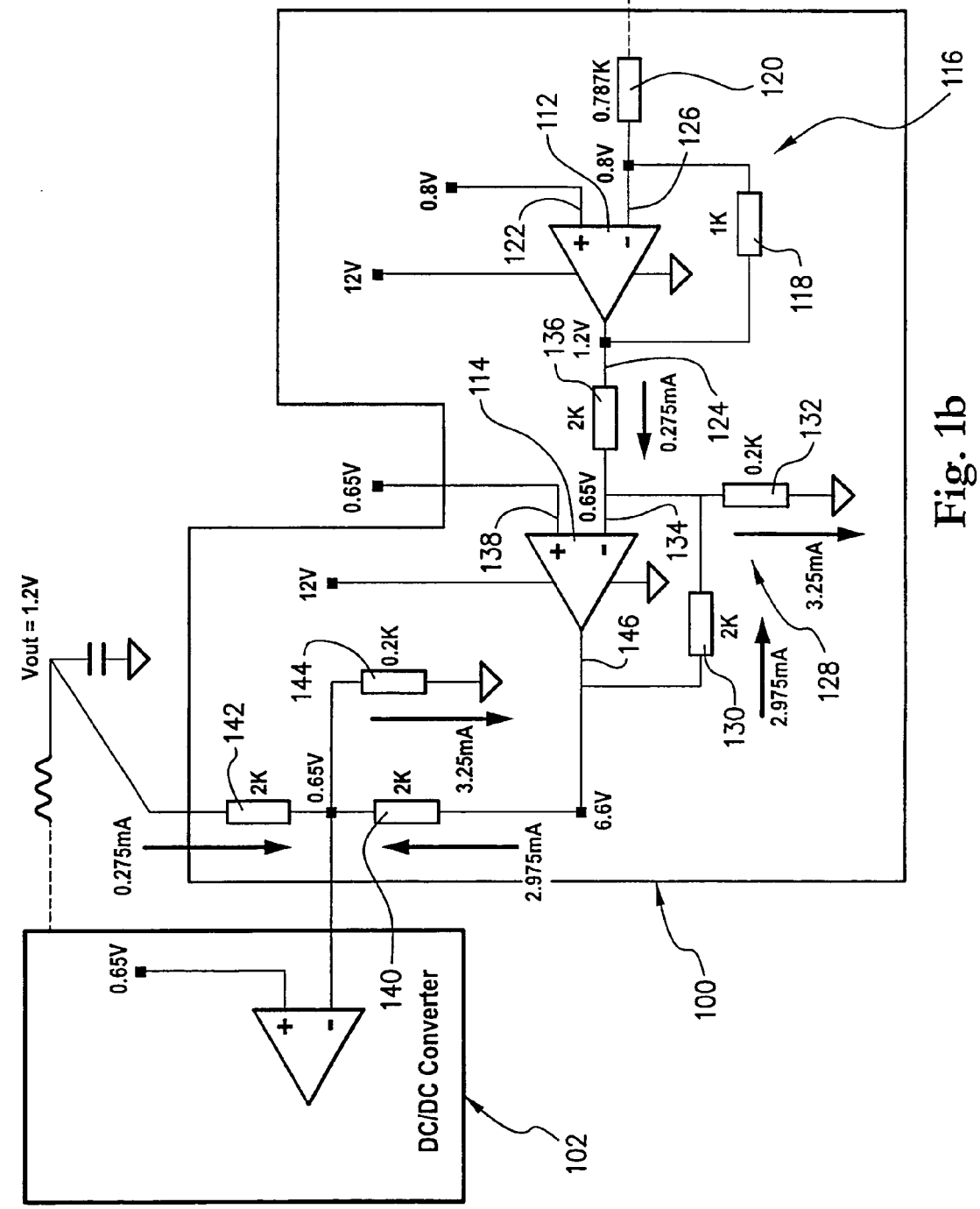

'across' the third resistor 144 of the second electronic circuit 110 it is possible for the fiber-optical module 104 to set, in accordance with the table in FIG. 1*a*, the output voltage of an adaptable power supply 102 that does not use a 0.8 volt reference voltage. The various current flows present in the device 100 when it is powered-up are shown in FIG. 1*b*.

Figure 2:
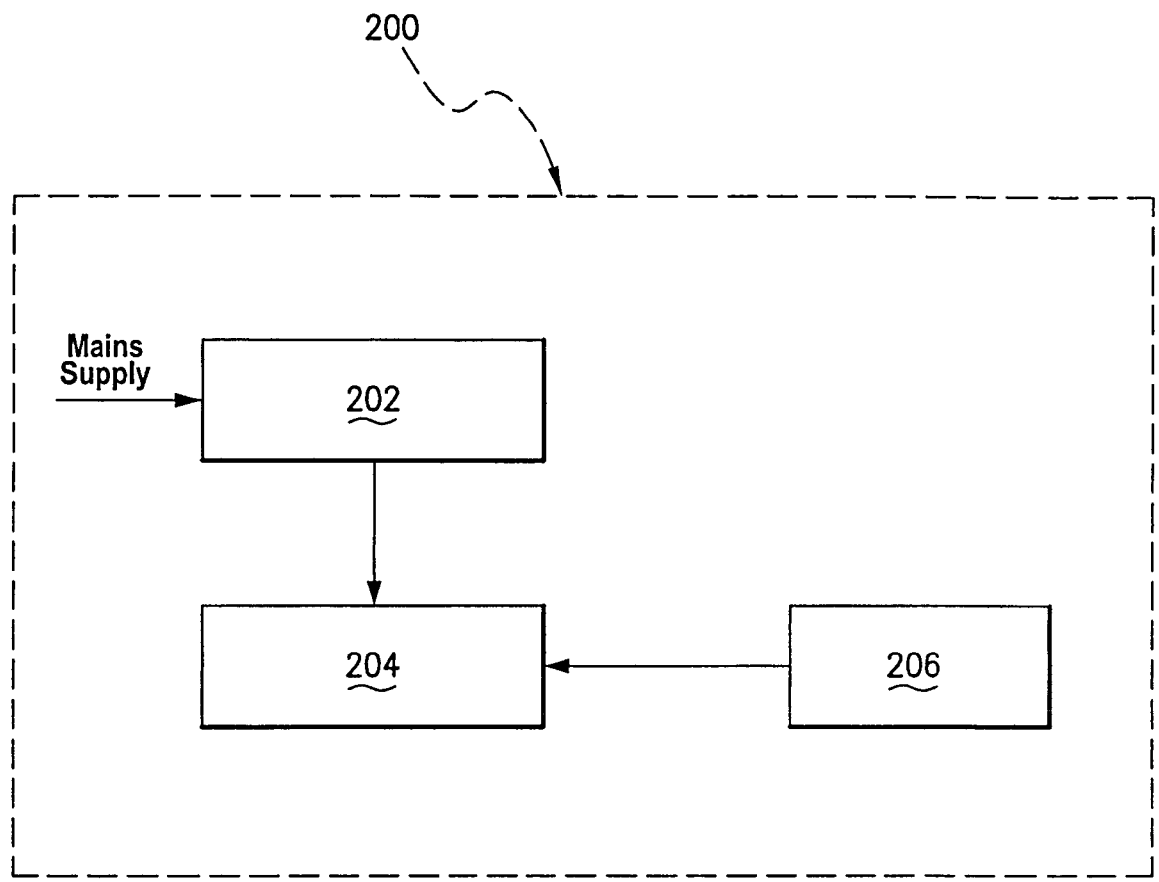

It is envisaged that the device 100 could be independent of the adaptable power supply 102 and the fiber-optical module 104, in which case the device 100 would be housed in its own casing and arranged to interconnect the adaptable power supply 102 and the fiber-optical module 104. In an alternative embodiment, the device 100 may be integrated into the adaptable power supply 102 per se. A block diagram of such an adaptable power supply 200 is shown in FIG. 2. The adaptable power supply 200 basically includes an output voltage circuit 202, which is in the form of a switch-mode transformer. The adaptable power supply 200 also includes a voltage control circuit 204, which is in the form of a DC-DC converter that is not restricted to any particular reference voltage. The adaptable power supply 200 also includes the aforementioned device 206.

While the invention has been described with reference to the preferred embodiment, it will be understood by those skilled in the art that alterations, changes and improvements may be made and equivalents may be substituted for the elements thereof and steps thereof without departing from the scope of the present invention. In addition, many modifications may be made to adapt to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiments disclosed as the best mode contemplated for carrying out this invention, but that the invention will include all embodiments falling within the scope of the independent claims.

What is claimed is:

1. A device for providing a control voltage that is substantially equivalent to a reference voltage used by a power supply, the device comprises:
   a first electronic circuit that is arranged to be connected to a ground via a resistor and to produce a supplementary voltage that is dependant on a resistance of the resistor, wherein the first electronic circuit comprises a first differential amplifier circuit that is arranged to produce an intermediate voltage that corresponds to an output voltage of the power supply, and a second differential amplifier circuit that is arranged to receive the intermediate voltage and to produce the supplementary voltage; and
   a second electronic circuit that is arranged to present a resistance to a current to provide the control voltage and to receive the output voltage of the power supply and the supplementary voltage to effect the current.

2. The device as claimed in claim 1, wherein the intermediate voltage is substantially equivalent to the output voltage.

3. The device as claimed in claim 1, wherein the first differential amplifier circuit comprises a first operational amplifier and a first feedback network that is arranged to incorporate the resistor and to provide the first operational amplifier with negative feedback and wherein the second differential amplifier circuit comprises a second operational amplifier and a second feedback network that is arranged to provide the second operational amplifier with negative feedback the second operational amplifier comprising an inverting input that is coupled to an output of the first operational amplifier.

4. The device as claimed in claim 1, wherein the second electronic circuit comprises a plurality of resistors.

5. The device as claimed in claim 1, wherein the resistor and the supplementary voltage correspond, respectively, to a specified resistance and a specified voltage identified in an X2 multi-source agreement.

6. A power supply that comprises:
   an output voltage circuit that is arranged to produce an output voltage from a supply voltage;
   a voltage control circuit that is arranged to set a potential of the supply voltage based on a reference voltage and a control voltage;
   a first electronic circuit that is arranged to be connected to a ground via a resistor and to produce a supplementary voltage that is dependant on a resistance of the resistor, wherein the first electronic circuit comprises a first differential amplifier circuit that is arranged to produce an intermediate voltage that corresponds to the output voltage, and a second differential amplifier circuit that is arranged to receive the intermediate voltage and to produce the supplementary voltage; and
   a second electronic circuit that is arranged to present a resistance to a current in order to provide the control voltage such that it is substantially equivalent to the reference voltage, the second electronic circuit being further arranged to receive the output voltage and the supplementary voltage to effect the current.

7. The power supply as claimed in claim 6, wherein the intermediate voltage is substantially equivalent to the output voltage.

8. The power supply as claimed in claim 6, wherein the first differential amplifier circuit comprises a first operational amplifier and a first feedback network that is arranged to incorporate the resistor and to provide the first operational amplifier with negative feedback, and wherein the second differential amplifier circuit comprises a second operational amplifier and a second feedback network that is arranged to provide the second operational amplifier with negative feedback, the second operational amplifier comprising an inverting input that is coupled to an output of the first operational amplifier.

9. The power supply as claimed in claim 6, wherein the second electronic circuit comprises a plurality of resistors.

10. The power supply as claimed in claim 6, wherein the resistor and the supplementary voltage correspond, respectively, to a specified resistance and a specified voltage identified in an X2 multi-source agreement.

11. A power supply comprising:
    an output voltage circuit that is arranged to produce an output voltage from a supply voltage;
    a voltage control circuit that is arranged to set a potential of the supply voltage based on a reference voltage and a control voltage;
    a first electronic circuit that is arranged to be connected to a ground via a resistor and to produce an intermediate voltage substantially equivalent to the output voltage and, based on the intermediate voltage, produce a supplementary voltage that is dependant on a resistance of the resistor; and
    a second electronic circuit that is arranged to present a resistance to a current in order to provide the control voltage such that it is substantially equivalent to the reference voltage, the second electronic circuit being further arranged to receive the output voltage and the supplementary voltage to effect the current.

12. The power supply as claimed in claim 11, wherein the first electronic circuit comprises a differential amplifier that has a non-inverting input coupled to a second reference voltage, an inverting input coupled to the resistor, and an output coupled to produce the intermediate voltage.

13. The power supply as claimed in claim 11, wherein the first electronic circuit comprises:
- a first differential amplifier circuit that is arranged to produce the intermediate voltage; and
- a second differential amplifier circuit that is arranged to receive the intermediate voltage and to produce the supplementary voltage.

14. The power supply as claimed in claim 11, wherein the second electronic circuit comprises a plurality of resistors.

15. The power supply as claimed in claim 11, wherein the resistor comprises a variable resistor.

16. The device as claimed in claim 1, wherein the resistor comprises a variable resistor.

17. The power supply as claimed in claim 6, wherein the resistor comprises a variable resistor.

* * * * *

UNITED STATES PATENT AND TRADEMARK OFFICE
CERTIFICATE OF CORRECTION

| | | |
|---|---|---|
| PATENT NO. | : 7,504,809 B2 | Page 1 of 1 |
| APPLICATION NO. | : 11/138948 | |
| DATED | : March 17, 2009 | |
| INVENTOR(S) | : Kais Kaizar Badami | |

It is certified that error appears in the above-identified patent and that said Letters Patent is hereby corrected as shown below:

In column 5, line 61, in Claim 3, delete "feedback" and insert -- feedback, --, therefor.

In column 5, lines 64-65, in Claim 3, delete "feedback" and insert -- feedback, --, therefor.

Signed and Sealed this

Sixteenth Day of February, 2010

David J. Kappos
*Director of the United States Patent and Trademark Office*